US011438922B2

(12) United States Patent
Zhou et al.

(10) Patent No.: US 11,438,922 B2
(45) Date of Patent: Sep. 6, 2022

(54) MAC-CE DUPLICATION IN PACKET DUPLICATION

(71) Applicant: QUALCOMM Incorporated, San Diego, CA (US)

(72) Inventors: Yan Zhou, San Diego, CA (US); Tao Luo, San Diego, CA (US); Hamed Pezeshki, San Diego, CA (US); Konstantinos Dimou, San Francisco, CA (US); Rajat Prakash, San Diego, CA (US); Vinay Joseph, Calicut (IN); Sony Akkarakaran, Poway, CA (US); Juan Montojo, San Diego, CA (US); Kazuki Takeda, Tokyo (JP); Xiaoxia Zhang, San Diego, CA (US); Seyed Ali Akbar Fakoorian, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 16/929,491

(22) Filed: Jul. 15, 2020

(65) Prior Publication Data

US 2021/0022168 A1 Jan. 21, 2021

Related U.S. Application Data

(60) Provisional application No. 62/876,600, filed on Jul. 19, 2019, provisional application No. 62/876,556, filed on Jul. 19, 2019.

(51) Int. Cl.
*H04B 17/309* (2015.01)
*H04L 1/18* (2006.01)
(Continued)

(52) U.S. Cl.
CPC ....... *H04W 72/1289* (2013.01); *H04W 72/14* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2012/0213089 A1* | 8/2012 | Shi | H04L 5/0091 370/241 |
| 2018/0084495 A1* | 3/2018 | Moon | H04W 72/082 |

(Continued)

FOREIGN PATENT DOCUMENTS

WO    WO-2018172136 A1    9/2018

OTHER PUBLICATIONS

CATT: "Dynamic Leg Selection with CA-Only Duplication", 3GPP Draft, 3GPP TSG-RAN WG2 Meeting #106, R2-1905749 Dynamic Leg Selection with CA-Only Duplication, 3rd Generation Partnership Project (3GPP), Mobile Competence Centre, 650, Route Des Lucioles, F-06921 Sophia-Antipolis Cedex, vol. RAN WG2. No. Reno, USA, May 13, 2019-May 17, 2019, May 13, 2019 (May 13, 2019), XP051729248, pp. 1-6, Retrieved from the Internet: URL:http://www.3gpp.org/ftp/Meetings%5F3GPP%5FSYNC/RAN2/Docs/R2%201905749%2Ezip [retrieved on May 13, 2019].

(Continued)

*Primary Examiner* — Sithu Ko
(74) *Attorney, Agent, or Firm* — Qualcomm Incorporated

(57) ABSTRACT

Aspects for MAC-CE duplication for packet repetition in uplink and downlink are disclosed. In one particular aspect a method of wireless communication includes receiving, by a user equipment (UE), a message including a component carrier (CC) identifier (ID) for a particular Medium Access Control (MAC) control element (MAC-CE). The method also includes receiving, by the UE, a first MAC-CE via a (Continued)

first CC of a plurality of CCs, and receiving, by the UE, a second MAC-CE via a second CC of the plurality of CCs. The CC ID included in the message corresponds to a CC ID for the second MAC-CE. The method further includes combining, by the UE based on the CC ID for the second MAC-CE, a first signal corresponding to the first MAC-CE and a second signal corresponding to the second MAC-CE to generate a combined signal for decoding.

30 Claims, 9 Drawing Sheets

(51) Int. Cl.
*H04W 72/12* (2009.01)
*H04W 72/14* (2009.01)
*H04W 80/02* (2009.01)

(56) References Cited

U.S. PATENT DOCUMENTS

| | | | |
|---|---|---|---|
| 2018/0368132 A1 | 12/2018 | Babaei et al. | |
| 2019/0116582 A1* | 4/2019 | Pelletier | H04W 72/10 |
| 2019/0387535 A1* | 12/2019 | Kim | H04W 72/1289 |
| 2020/0059821 A1* | 2/2020 | Wirth | H04L 1/1851 |
| 2020/0092746 A1* | 3/2020 | Baek | H04W 28/0263 |
| 2020/0128567 A1* | 4/2020 | Zhu | H04W 72/14 |
| 2021/0144583 A1* | 5/2021 | Xiao | H04W 76/27 |

OTHER PUBLICATIONS

International Search Report and Written Opinion—PCT/US2020/042302—ISA/EPO—dated Oct. 6, 2020.

* cited by examiner

MAC-CE DUPLICATION IN PACKET DUPLICATION

CROSS-REFERENCE TO RELATED APPLICATIONS

This application claims the benefit of U.S. Provisional Patent Application No. 62/876,556, entitled, "MAC-CE Duplication In Packet Duplication," filed on Jul. 19, 2019, and the benefit of U.S. Provisional Patent Application No. 62/876,600, entitled, "MAC-CE Duplication In Packet Duplication," filed on Jul. 19, 2019, both of which are expressly incorporated by reference herein in their entirety.

BACKGROUND

Field

Aspects of the present disclosure relate generally to wireless communication systems, and more particularly, to MAC-CE duplication for packet duplication. Certain embodiments of the technology discussed below can enable and MAC-CE duplication for packet duplication to enable cross carrier repetition.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Conventionally, Medium Access Control (MAC) control elements (MAC-CEs) include control information for a particular component carrier (CCs) on which the MAC-CE is transmitted. Such an approach may not be the most robust and/or reliable approach to convey data, such as data conveyed on Frequency Range 2 (FR2) for 5G NR, which includes frequency bands from 24.25 GHz to 52.6 GHz in mm-Wave. To illustrate, when duplicating MAC-CEs and/or performing cross carrier repetitions, a CC ID may not be included in the duplicated MAC-CEs. Additionally, if a transport block (TB) (e.g., PDCCH/PDSCH) has the same content across multiple CCs, a user equipment (UE) is not aware and does not combine them. As a result, conventional techniques of per-CC based MAC-CEs may use multiple cycles to process duplicated MAC-CEs and TBs. Accordingly, conventional techniques of per-CC based MAC-CEs may be deficient, especially when transmitting periodic data, e.g., data that expires.

SUMMARY

The described techniques relate to improved methods, systems, devices, and apparatuses that support MAC-CE duplication, such as MAC-CE duplication for cross carrier repetition. Cross carrier repetition and MAC-CE duplication may enable cross carrier repetition enhancements, such as periodic grant cross carrier repetition enhancements. The cross carrier repetition enhancements enable devices (e.g., UEs and base stations) of a network to employ cross carrier repetitions using duplicated MAC-CEs. By using duplicated MAC-CEs and indicating and/or signaling CC IDs for the duplicated MAC-CEs, cross carrier repetition operations can be performed more quickly and more reliably, which reduces latency and increases throughput. Generally, the described techniques provide for indicating an intended CC ID for duplicated MAC-CEs when an original or base MAC-CE does not signal (e.g., include or carry) a CC ID. Such techniques may include configuration messages that include fixed intended CC IDs, unique MAC-CEs, CC ID signaling messages, or a combination thereof.

The cross carrier repetition enhancements may enable operation in ultra-reliable low latency communication modes (URLLC), such as enhanced URLLC (eURLLC). One exemplary operation which is enabled by the described methods, devices, and systems includes supporting (e.g., signaling) of CC ID for duplicated MAC-CEs for periodic grants in both uplink and/or downlink. To illustrate, devices may signal CC IDs for duplicated MAC-CEs for CGs and/or SPSs when the original or base MAC-CE does not include a CC ID.

In one aspect of the disclosure, a method for wireless communication includes receiving, by a user equipment (UE), a message including a component carrier (CC) identifier (ID) for a particular Medium Access Control (MAC) control element (MAC-CE). The method also includes receiving, by the UE, a first MAC-CE via a first CC of a plurality of CCs, and receiving, by the UE, a second MAC-CE via a second CC of the plurality of CCs. The CC ID included in the message corresponds to a CC ID for the second MAC-CE. The method further includes combining, by the UE based on the CC ID for the second MAC-CE, a first signal corresponding to the first MAC-CE and a second signal corresponding to the second MAC-CE to generate a combined signal for decoding.

In an additional aspect of the disclosure, an apparatus configured for wireless communication is disclosed. The apparatus includes at least one processor, and a memory coupled to the processor. The processor is configured to receive, by a user equipment (UE), a message including a component carrier (CC) identifier (ID) for a particular Medium Access Control (MAC) control element (MAC-CE). The processor is also configured to receive, by the UE, a first MAC-CE via a first CC of a plurality of CCs, and to receive, by the UE, a second MAC-CE via a second CC of the plurality of CCs. The CC ID included in the message corresponds to a CC ID for the second MAC-CE. The processor is further configured to combine, by the UE based on the CC ID for the second MAC-CE, a first signal corresponding to the first MAC-CE and a second signal corresponding to the second MAC-CE to generate a combined signal for decoding.

In another aspect of the disclosure, a method for wireless communication includes transmitting, by a base station, a message including a component carrier (CC) identifier (ID) for a particular Medium Access Control (MAC) control element (MAC-CE); transmitting, by the base station, a first MAC-CE via a first CC of a plurality of CCs; duplicating, by the base station, the first MAC-CE to generate a second MAC-CE; and transmitting, by the base station, a second MAC-CE via a second CC of the plurality of CCs, wherein the CC ID included in the message corresponds to a CC ID for the second MAC-CE, wherein the CC ID indicates a CC ID of the first CC for the second MAC-CE, and wherein the CC ID is configured to indicate to combine a first signal corresponding to the first MAC-CE and a second signal corresponding to the second MAC-CE to generate a combined signal for decoding.

In an additional aspect of the disclosure, an apparatus configured for wireless communication is disclosed. The apparatus includes at least one processor, and a memory coupled to the processor. The processor is configured to transmit, by a base station, a message including a component carrier (CC) identifier (ID) for a particular Medium Access Control (MAC) control element (MAC-CE); transmit, by the base station, a first MAC-CE via a first CC of a plurality of CCs; duplicate, by the base station, the first MAC-CE to generate a second MAC-CE; and transmit, by the base station, a second MAC-CE via a second CC of the plurality of CCs, wherein the CC ID included in the message corresponds to a CC ID for the second MAC-CE, wherein the CC ID indicates a CC ID of the first CC for the second MAC-CE, and wherein the CC ID is configured to indicate to combine a first signal corresponding to the first MAC-CE and a second signal corresponding to the second MAC-CE to generate a combined signal for decoding.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
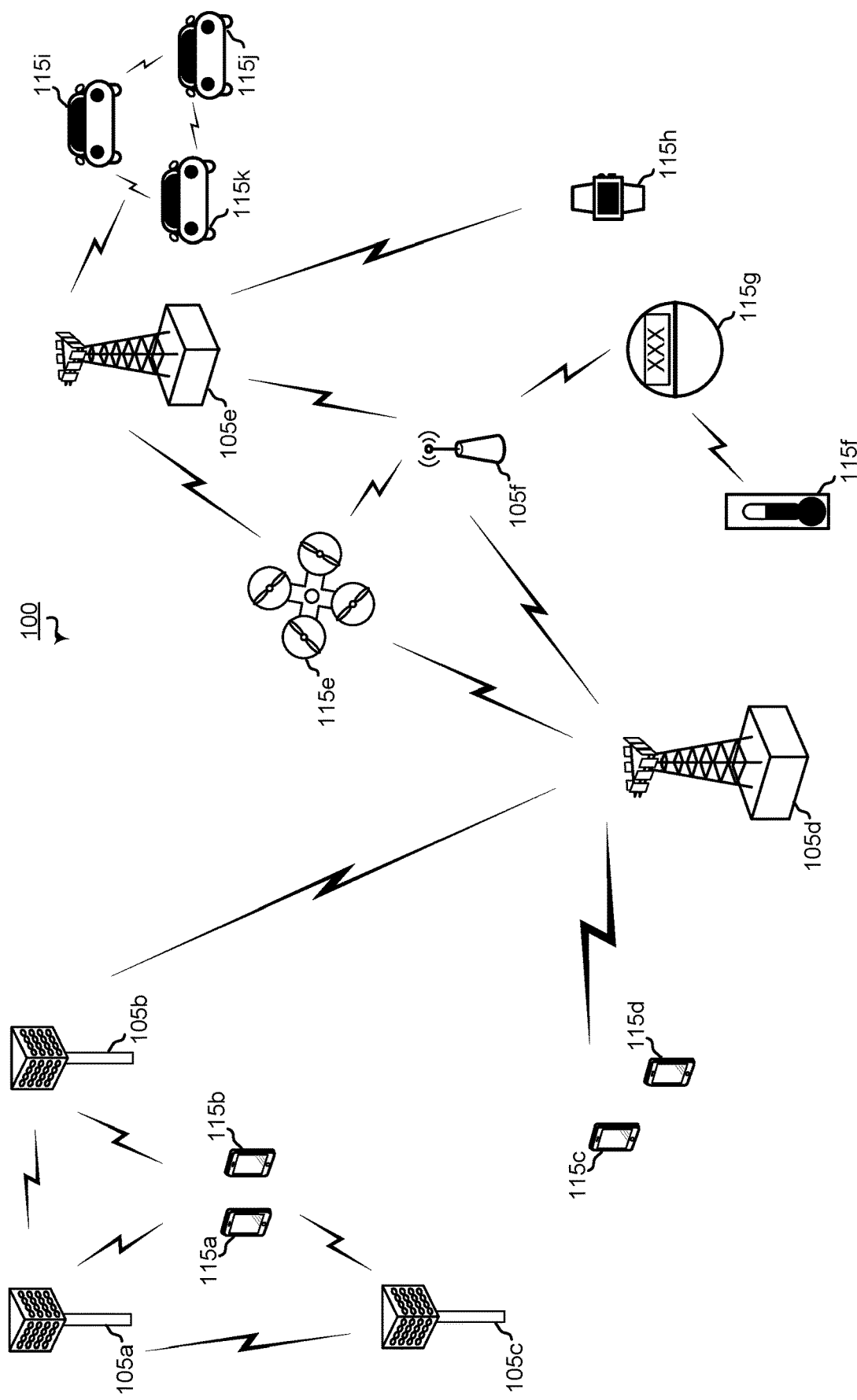
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-*type devices accessing* 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
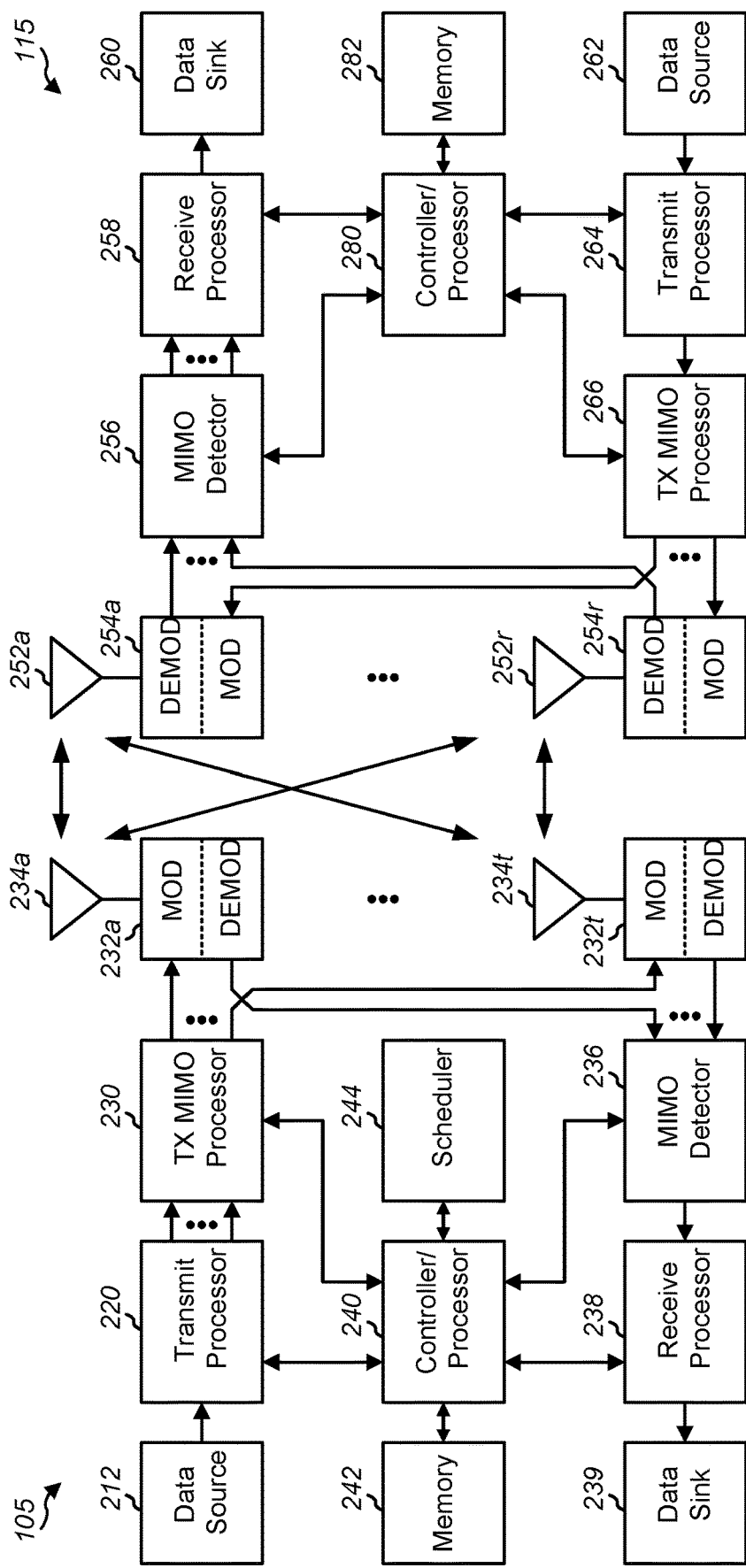
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 7 and 8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
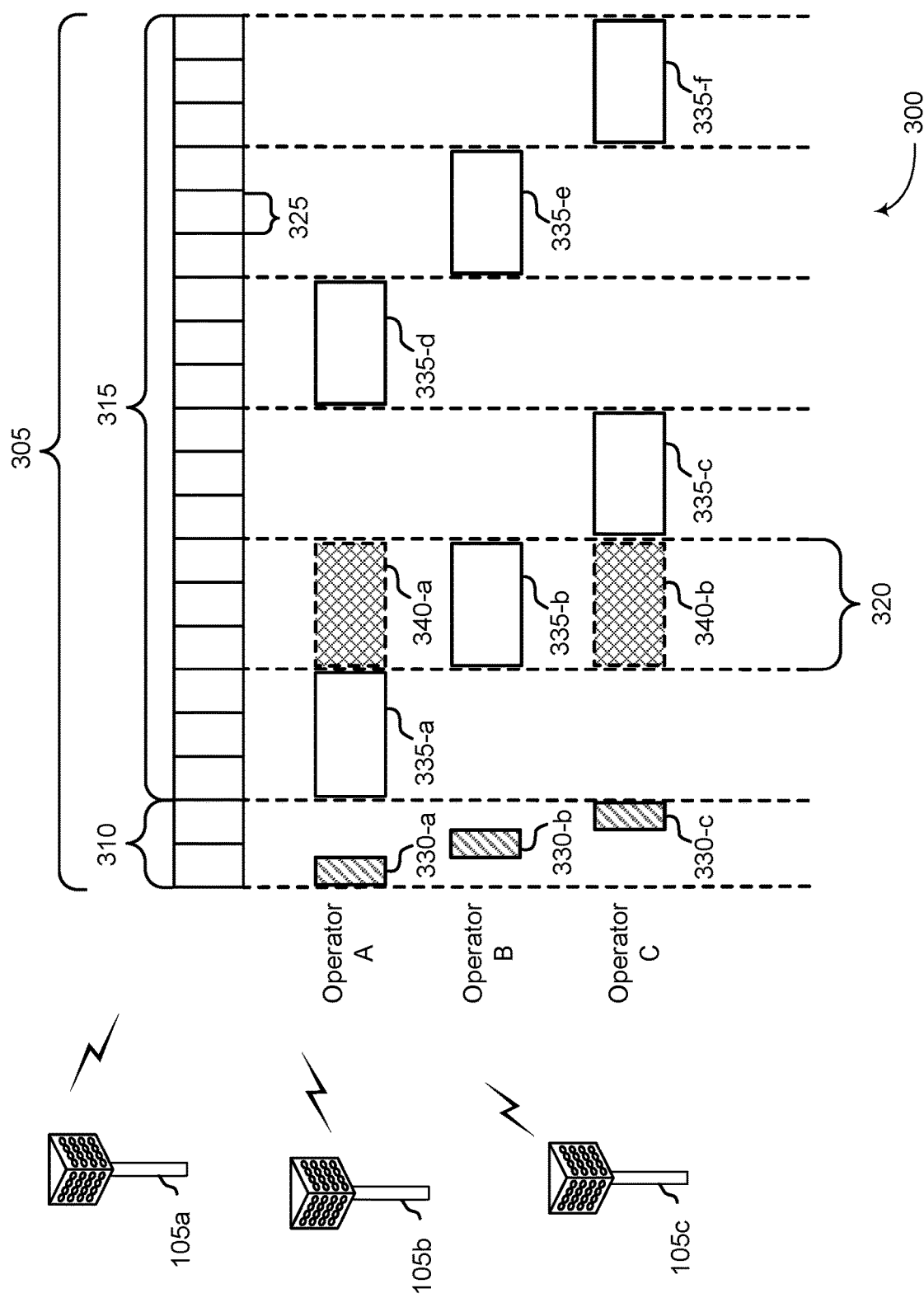
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In 5G networks, control information (for uplink and/or downlink) may be conveyed in a medium access control (MAC) control element (CE) (i.e., in a MAC header) of a physical channel packet (i.e., a data packet or physical channel signal). For example, a UE 115 may transmit a MAC-CE in a PUCCH or a PUSCH, and a base station may transmit a MAC-CE in a PDCCH or a PDSCH, i.e., in headers thereof. Additionally, MAC-CEs can be transmitted in a payload of a physical channel packet. Examples of control information include information for carrier aggregation and cross carrier repetition, such as a component carrier (CC) identified (ID, CC ID). Examples of MAC-CEs include a Buffer Status Report type MAC-CE, a C-RNTI type MAC-CE, a UE Contention Resolution Identity type MAC-CE, a Timing Advance Command type MAC-CE, a DRX Command type MAC-CE, a Long DRX Command type MAC-CE, a Configured Grant Confirmation type MAC-CE, a Single Entry PHR type MAC-CE, a Multiple Entry PHR type MAC-CE, a SCell Activation/Deactivation type MAC-CE, a Duplication Activation/Deactivation type MAC-CE, a SP CSI-RS/CSI-IM Resource Set Activation/Deactivation type MAC-CE, an Aperiodic CSI Trigger State Subselection type MAC-CE, a TCI States Activation/Deactivation for UE-specific PDSCH type MAC-CE, a TCI State Indication for UE-specific PDCCH type MAC-CE, a SP CSI reporting on PUCCH Activation/Deactivation type MAC-CE, a SP SRS Activation/Deactivation type MAC-CE, a PUCCH spatial relation Activation/Deactivation type MAC-CE, a SP ZP CSI-RS Resource Set Activation/Deactivation type MAC-CE, and a Recommended bit rate type MAC-CE.

5G and NR access technologies provide for duplication of a MAC-CE to convey control information in uplink or downlink for multiple channels or carriers. However, in conventional operations, some MAC-CEs (i.e., some types of MAC-CEs) include control information only for the intended component carrier (CC) on which they are sent. To illustrate, a MAC-CE sent on/via a first component carrier (CC1) indicates control information for the first component carrier (CC1) and a duplicated MAC-CE sent on/via a second component carrier (CC2) indicates control information for the second component carrier (CC2). Accordingly, such CC only MAC-CEs do not include a CC ID to indicate an intended CC ID for the MAC-CE and the control information thereof, as there is no need. That is, the act of transmitting the MAC-CE on/via the CC indicates or signals the intended CC ID for the control information of the MAC-CE.

However, when duplicating such MAC-CEs (i.e., CC ID less MAC-CEs) for other channels or carriers, the duplicated MAC-CEs will also not include a CC ID. Therefore, the duplicated MAC-CEs will not identify a correct or an intended CC, such as the CC ID of the CC on which the original or base MAC-CE is transmitted. Additionally, because the duplicated MAC-CEs may be sent on another CC, such as on a different CC in the same cycle to facilitate lower latency, a receiving device (e.g., UE or base station) may not know how to process the duplicated MAC-CE and/or the corresponding data (e.g., payload or L1 signal) when the duplicated MAC-CE is intended to indicate another CC. Consequently, the receiving device takes more time to process such information, such as by trial and error, or is not able to process such information at all. When dealing with periodic data or data that expires, the receiving device may not be able to process and decode the data in time (e.g., within 1 frame or within the same frame) before the data expires and is essentially useless. Thus, reliability and latency are reduced and/or MAC-CE duplication operations are not possible.

Systems and methods described herein are directed to duplication of MAC-CEs and indicating/signaling an intended CC for the duplicated MAC-CEs. In some implementations, duplication of MAC-CEs may be used for TB repetitions such that the TB repetitions can be combined for joint decoding based on the duplicated MAC-CEs. In a particular implementation, the TB repetitions are transmitted in different carriers (e.g., CCs) during the same cycle, such as to enable cross carrier repetition for joint decoding during a single cycle. The systems and methods described herein enable physical channel or layer 1 (L1) signals, such as PUCCH, PUSCH, PDCCH, PDSCH, etc. transmissions, to be combined and/or more efficiently combined by indicating an intended CC for duplicated MAC-CEs. Such duplication of MAC-CEs and signaling of CC IDs for the duplicated MAC-CEs may enable processing and decoding data within the same frame or within one frame, e.g., processing times of 0.5 ms or less.

To illustrate, when performing carrier aggregation or cross carrier repetition, such as cross frequency band or cross frequency range aggregation or repetition, MAC-CEs can be used to more quickly and more effectively identify physical channel signals (e.g., their corresponding payload) for carrier aggregation/repetition joint decoding, i.e., for combination thereof to increase signal strength (e.g., combining gain). The more efficient combining of TB repetitions decreases signal processing time, which reduces latency, and increases reliability (because with repetitions there is less chance to have signal blockage, interference, low signal strength, etc., which prevents a transmission from being successfully decoded). Accordingly, such systems and methods can be utilized for URLLC communications, such as eURLLC. Additionally, such systems may be used for periodic information, e.g., information that expires within a set duration, such as 1 cycle, and with reduced cycle durations, such as 0.5 milliseconds (ms).

Figure 4:
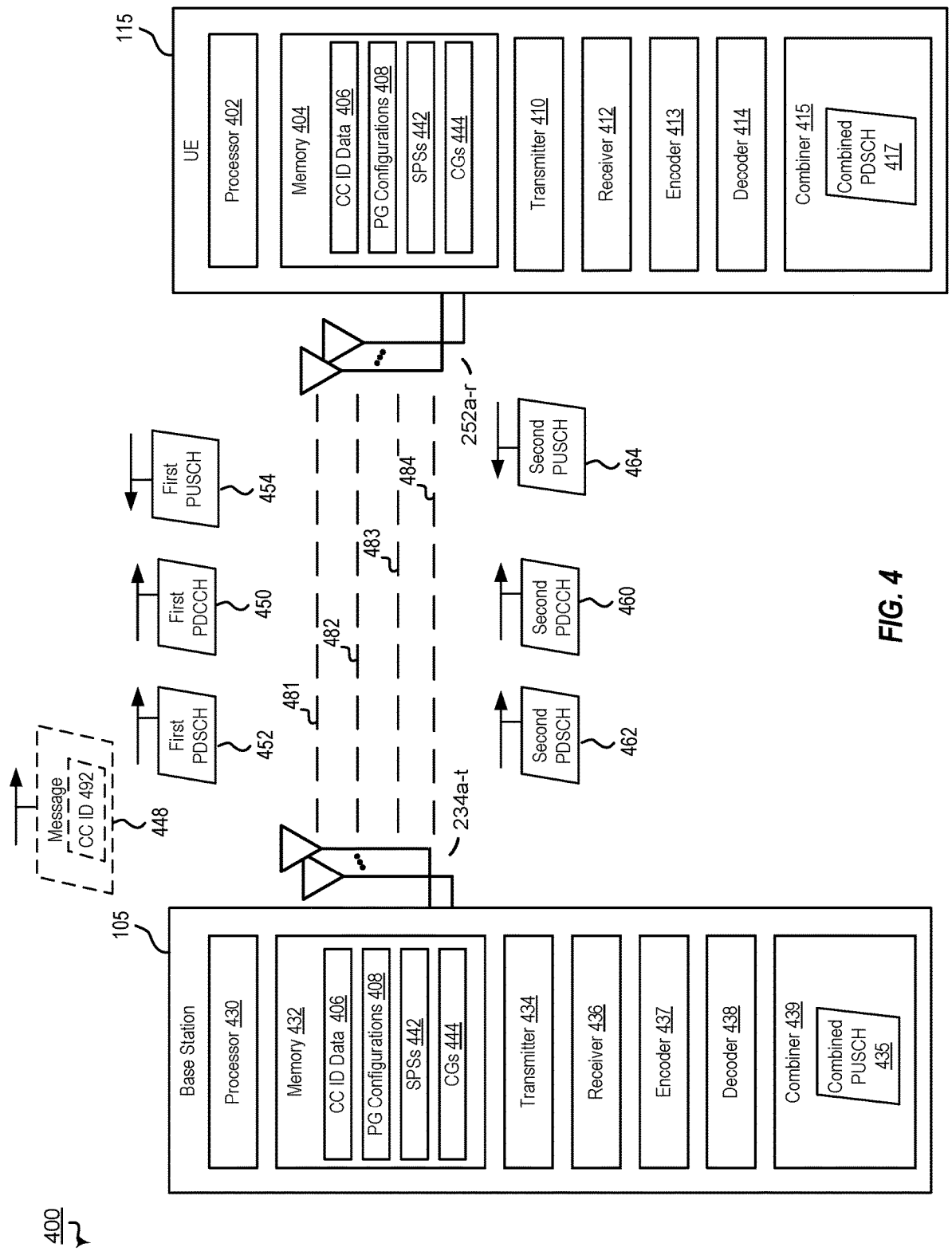
FIG. 4 is a block diagram illustrating an example of a wireless communications system that enables MAC-CE duplication in accordance with aspects of the present disclosure.

FIG. 4 illustrates an example of a wireless communications system 400 that supports MAC-CE duplication and indication of CC ID for duplicated MAC-CEs in accordance with aspects of the present disclosure. To illustrate, an initial or original TB on one carrier (e.g., component carrier (CC)) can be combined with repetitions of the TB on one or more other carriers using duplicated MAC-CEs. As an illustrative, non-limiting example, the TBs can correspond to or be scheduled by periodic grants. For example, periodic grants (e.g., configured grants (CGs)) on one carrier (e.g., component carrier (CC)) can be combined with periodic grants on another carrier using signaled CC IDs of the duplicated MAC-CEs. That is MAC-CEs of or corresponding to configured grants (CGs) on other carriers may indicate or identify a CC ID of the base or original carrier for combining and joint decoding of physical layer signals (e.g., layer 1 (L1) signals). The duplicated MAC-CEs may indicate or identify the CC of the base or original carrier by being assigned an intended carrier, such as by CC ID. The CC ID may be indicated or signaled by configuration message (e.g., a RRC or DCI prior to the TB and a cycle thereof) or by a message of the TB and/or within the cycle thereof.

In some examples, wireless communications system 400 may implement aspects of wireless communication system 100. For example, wireless communications system 400 may include UE 115 and base station 105. Although one UE and one base station are illustrated, in other implementations, wireless communications system 400 may include multiple UEs 115, multiple base stations 105, or both. Duplicated MAC-CEs and indicated CC IDs may enable reduced overhead and latency when processing repetitions and thus may increase throughput and reduce latency. Cross carrier repetition (e.g., cross carrier packet or TB repetition) may further be utilized to increase reliability, and possibly throughput when interference or blockage is present on or more carriers (e.g., channels or CCs).

Base station 105 and UE 115 may be configured to communicate via frequency bands, such as FR1 having a frequency of 450 to 6000 MHz for Sub-6 GHz or FR2 having a frequency of 24250 to 2600 MHz for mm-Wave. It is noted that sub-carrier spacing (SCS) may be equal to 15, 30, 60, or 120 kHz for some data channels. Base station 105 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate a Physical Downlink Control Channel (PDCCH), a Physical Downlink Shared Channel (PDSCH), a Physical Uplink Control Channel (PUCCH), or a Physical Uplink Shared Channel (PUSCH). In some implementations, such transmissions may be scheduled by one or more periodic grants and may correspond to configured grants of the one or more periodic grants.

Each periodic grant (e.g., a configured grant (CG) or a semi-persistent scheduling (SPS) periodic grant) may have a corresponding configuration, such as configuration parameters/settings. CGs are used for uplink transmissions and SPSs are used for downlink transmissions. The periodic grant configuration may include CG/SPSs configurations and settings. Additionally, or alternatively, one or more periodic grants (e.g., CGs/SPSs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both.

In some implementations, two or more CCs are quasi co-located, such that the CCs have the same beam and/or same symbol. Additionally, or alternatively, CCs may be grouped as a set of one or more CCs, such as a cross carrier CORESET. Each CC in a CORESET may have the same cell ID, the same HARQ ID, or both.

In some implementations, control information may be communicated via base station 105 and UE 115. For example, the control information may be communicated suing MAC-CE transmissions, RRC transmissions, DCI, transmissions, another transmission, or a combination thereof.

UE 115 includes processor 402, memory 404, transmitter 410, receiver 412, encoder, 413, decoder 414, combiner 415, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store CC ID data 406, periodic grant configurations 408 (e.g., CG/SPS configurations), SPSs 442, CGs 444, or a combination thereof, as further described herein.

The CC ID data 406 may include or correspond to one or more intended component carrier identifiers (intended CC IDs) for one or more duplicated MAC-CEs. An intended CC ID may indicate an intended CC ID for a single duplicate MAC-CE, referred to as a single or dynamic intended CC ID. Alternatively, an intended CC ID may indicate an intended CC ID for multiple duplicate MAC-CEs, such as duplicated MAC-CEs on the same CC, duplicated MAC-CEs of the same TB, duplicated MAC-CEs of the same cycle, or a combination thereof, and may be referred to as a fixed intended CC ID. The CC ID data 406 may be transmitted by MAC-CE, DCI, in a TB (e.g., physical channel), or RRC message.

Each periodic grant configuration of the one or more periodic grant configurations 408 includes scheduling information and/or transmission information for scheduling CGs, such as SPSs 442, CGs 444, or both. To illustrate, the scheduling information may include when and where the CGs are located in a next cycle. As another illustration, the transmission information may include the transmission and/or reception characteristics for transmitting/receiving the CGs, such as BWP ID, beam sweep enabled, beam sweep pattern, etc.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode, such as jointly encode and jointly decode, respectively. Combiner 415 may be configured to combine cross carrier signals/data to generate combined signals/data, such as combined signals/data for decoding by the decoder 414. Combiner 415 may be configured to perform diversity combining to generate a single improved signal from multiple signals. The combiner 415 may be configured to perform equal gain combining, maximalration combining, switched combining, selection combining, or a combination thereof. As the signals may be sent on different carriers, and thus may have different properties, such as length, the combiner 415 may generate an intermediate signal (modified signal) for combining. Alternatively, the combiner 415 may receive an intermediate signal for combining. For example, the intermediate signal may be modified to adjust for frequency/duration differences, channel setting differences, etc.

Base station 105 includes processor 430, memory 432, transmitter 434, receiver 436, encoder 437, decoder 438, combiner 439, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store CC ID data 406, periodic grant configurations 408, SPSs 442, CGs 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2. Encoder 437, decoder 438, and combiner 439 may include the same functionality as described with reference to encoder 413, decoder 414, and combiner 415, respectively.

During operation of wireless communications system 400, base station 105 may determine that UE 115 has cross carrier repetition capability, such as MAC-CE duplication based cross carrier repetition. For example, base station 105 may transmit a first message 448 that includes a cross carrier repetition capability indicator. In some implementations, base station 105 sends control information to indicate to UE 115 that MAC-CE duplication based cross carrier repetition is to be used. For example, in some implementations, first message 448 is transmitted by the base station 105 via a first carrier (e.g., a first channel or a first component carrier (CC)) of a plurality of carriers. As illustrated in FIG. 1, the first message 448 includes a CC ID 492. CC ID 492 may indicate an intended CC ID for MAC-CE duplication, such as a fixed intended CC ID value for all MAC-CE duplicates.

After transmission of the first message 448 (e.g., a MAC-CE configuration message, such as a RRC message or a DCI), transmissions may be scheduled by the base station 105, the UE 115, or both. Such scheduled transmissions may include shared channel transmissions, such as PDSCH and/or PUSCH. These scheduled transmissions may include or correspond to repetitions or retransmissions in some implementations. For example, second PDSCH 462 is a retransmission or repetition of first PDSCH 452, correspond to the same TB. Such repetitions or retransmissions may be scheduled by periodic grant in some implementations. As an illustrative, non-limiting example, PDCCHs 450 and 460 include or correspond to periodic grants. The periodic grants are configured to schedule one or more configured grants (e.g., PDSCHs or PUSCHs).

PDCCHs 450 and 460 may indicate activation or reactivation of a periodic grant, such as an SPS or CG. To illustrate, the PDCCHs 450 and 460, such as a DCI message, may be an SPS/CG activation message or an SPS/CG reactivation message. Based on a cross carrier repetition mode, the base station 105 and UE 115 initiate scheduling of one or more CGs/SPSs for multiple channels or CCs. For example, the UE 115 determines a particular periodic grant configuration of the periodic grant configurations 408 based on data of the PDCCHs 450 and 460.

The UE 115 schedules SPSs 442, CGs 444 based on the determined periodic grant configuration indicated by the PDCCHs 450 and 460. The CGs may correspond to uplink or downlink transmissions. As illustrated in FIG. 4, the SPSs 442 scheduled include downlink CGs, such as PDSCHs, and the CGs 444 scheduled include uplink CGs, such as PUSCHs. Based on scheduling the SPSs 442 and CGs 444, the UE 115 and base station 105 monitor the scheduled SPSs and CGs 442, 444 for reception of transmissions or transmit the transmissions depending on the mode, uplink or downlink. In the example illustrated in FIG. 4, the SPSs 442 correspond to PDSCHs 452 and 462 and the CGs 444 correspond to PUSCHs 454 and 464.

Additionally, the UE 115 may transmit a response message to base station 105 in response to the first message 448. For example, the UE may transmit an acknowledgment message (e.g., a PUCCH). Although not shown in FIG. 4, the base station 105 may send multiple first message 448 in multiple CCs, as described and shown with reference to later figures. Such messages may be the same (repetitions) and may be included to improve reliability. Alternatively, the multiple messages 448 may each indicate a CC ID (e.g., 492) for a single corresponding MAC-CE.

Base station 105 may jointly encode PDSCHs to be transmitted via multiple CCs—e.g., cross carrier repetition. For example, base station 105 may transmit first PDSCH 452 via first CC 481 and may transmit second PDSCH 462 via second CC 482. Base station 105 may generate a first MAC-CE for the first PDSCH 452. The first MAC-CE may not indicate (e.g., include or carry) a CC ID (e.g., 492). Base station 105 may duplicate the first MAC-CE to generate a second MAC-CE for the second PDSCH 462. The base station 105 may indicate the intended CC ID for the second MAC-CE of the second PDSCH 462 by the CC ID 492 of the first message 448. In other implementations, the intended CC ID for the second MAC-CE is signaled by the base station 105. For example, the CC ID 492 is included in the duplicated second MAC-CE, is included in another MAC-CE of or corresponding to the second PDSCH 462, or is included in a PDCCH (e.g., 460) which schedules the second PDSCH 462 to indicate the intended CC ID of the duplicated second MAC-CE. Additionally, or alternatively, base station 105 may jointly encode PDCCHs and indicate CC IDs for duplicated MAC-CEs thereof.

UE 115 receives the multiple PDSCH (e.g., 452, 462) corresponding to the multiple PDCCH (e.g., 450, 460) and generates a combined PDSCH 417 based on the MAC-CEs. For example, processor 402 identifies PDSCHs for combination based on the CC ID corresponding to the second MAC-CE. Combiner 416 may be configured to combine energies of the multiple identified PDSCHs (e.g., 452, 462) to generate combined PDSCH 417. Decoder 414 may decode the combined PDSCH 417.

Based on the decoding of combined PDCCH 417, UE 115 may send one or more PUCCHs to base station 105. It is noted that PUCCH may include or correspond to an acknowledgment message, such as an ACK/NACK. UE 115 may send an ACK or a NACK based on a determination of whether combined PDSCH 417 was successfully decoded. To illustrate, the ACK is communicated if decoding is successful and the NACK is communicated if decoding is unsuccessful.

Similarly, UE 115 may jointly encode PUSCHs to be transmitted via multiple CCs—e.g., cross carrier repetition. For example, UE 115 may transmit first PUSCH 454 via third CC 483 and may transmit second PUSCH 464 via fourth CC 484. UE 115 may generate a first MAC-CE for the first PUSCH 454. The first MAC-CE may not indicate (e.g., include or carry) a CC ID (e.g., 492). UE 115 may duplicate the first MAC-CE to generate a second MAC-CE for the second PUSCH 464. The UE 115 may indicate the intended CC ID for the second MAC-CE of the second PUSCH 464 by the CC ID 492 of the first message 448. In other implementations, the intended CC ID for the second MAC-CE is signaled by the UE 115. For example, the CC ID 492 is included in the duplicated second MAC-CE, is included in another MAC-CE of or corresponding to the second PUSCH 464, or is included in a PDCCH (e.g., 460) which schedules the second PUSCH 464 to indicate the intended CC ID of the duplicated second MAC-CE. In a particular implementation, the intended CC ID signaled by the UE 115 is based on prior signaling or information from base station 105 (e.g., 492 of 448). Additionally, or alternatively, UE 115 may jointly encode PUCCHs and indicate CC IDs for duplicated MAC-CEs thereof.

Base station 114 receives the multiple PUSCHs (e.g., 454, 464) corresponding to the multiple PDCCHs (e.g., 450, 460), which scheduled the CGs of the multiple PUSCHs (e.g., 454, 464), and generates a combined PUSCH 435 based on the MAC-CEs. For example, processor 402 identifies PUSCHs for combination based on the CC ID corresponding to the second MAC-CE. Combiner 439 may be configured to combine signals (e.g., energies) of the multiple identified PUSCHs (e.g., 454, 464) to generate combined PUSCH 435. Decoder 438 may decode the combined PUSCH 435.

Based on the decoding of combined PDCCH 435, base station 105 may send one or more PDCCHs to UE 115. It is noted that a PDCCH may include or correspond to an acknowledgment message, such as an ACK/NACK. UE 115 may send an ACK or a NACK base on a determination of whether combined PUSCH 435 was successfully decoded. To illustrate, the ACK is communicated if decoding is successful and the NACK is communicated if decoding is unsuccessful.

Thus, FIG. 4 describes identifying intended CC IDs for duplicated MAC-CEs between UE 115 and base station 105. Identifying intended CC IDs for duplicated MAC-CEs enables a network to reduce latency and overhead and improve reliability when duplicating packets or TBs, as compared to duplication of MAC-CEs without identifying an intended CC ID. Improving performance of duplicating packets or TB (e.g., cross carrier repetition operations, such as cross carrier repetition operations for periodic grants) may improve throughput for communications on the network and enable use of mm wave frequency ranges and URLLC modes.

Figure 5:
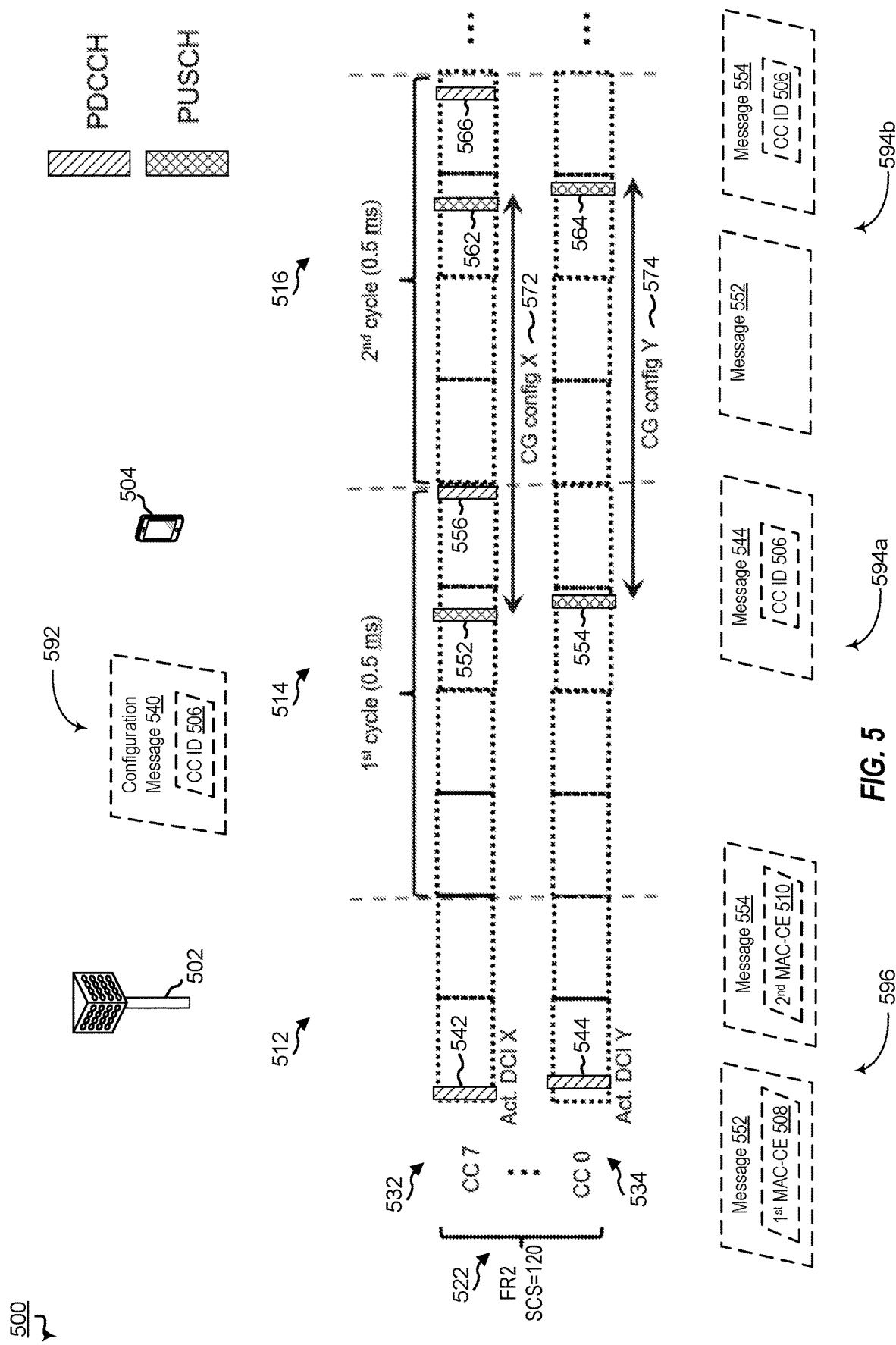
FIG. 5 is an example of a block diagram illustrating a portion of an NR network in which communications occur between a base station and UE each configured according to aspects of the present disclosure.
Figure 6:
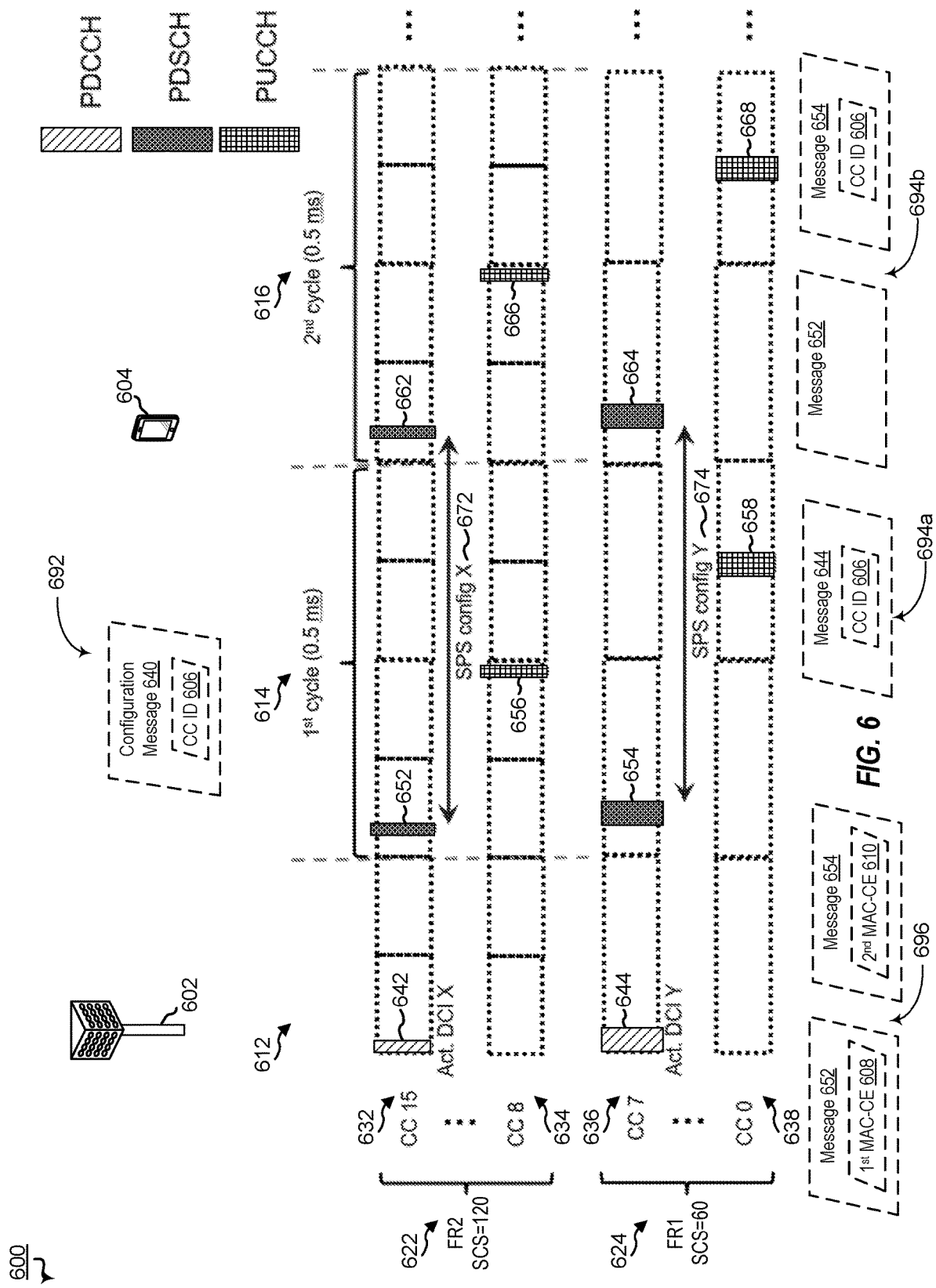
FIG. 6 is an example of a block diagram illustrating a portion of an NR network in which communications occur between a base station and UE each configured according to aspects of the present disclosure.

FIGS. 5 and 6 illustrate examples of indicating CC ID when duplicating MAC-CEs. FIG. 5 illustrates an example of MAC-CE duplication for uplink across frequency bands of the same frequency range. FIG. 6 illustrates an example of MAC-CE duplication for downlink across frequency bands of the different frequency ranges.

Referring to FIG. 5, FIG. 5 illustrates a timing diagram 500 illustrating communications between a base station 502 and a UE 504. As illustrated in timing diagram 500, uplink configured grants are illustrated. Base station 502 may direct the UE 504 to use an intended CC ID 506 for uplink configured grants. In some implementations, implementations in mode 592, base station 502 may signal the intended CC ID 506 for one or more CCs by message 540 (e.g., a configuration message, such as first message 448). The message 540 may indicate a fixed or static intended CC ID for multiple duplicated MAC-CEs. In other implementations, implementations in modes 594a and 594b, the base station 502 may signal the intended CC ID 506 by using another message or messages, such as non-configuration messages. Such other messages may indicate a dynamic CC ID 506 for one duplicated MAC-CE.

Referring to timing diagram 500, multiple cycles (first cycle 512, second cycle 514, and third cycle 516) are illustrated for a single frequency range (e.g., FR1 or FR2), a frequency range 522 (e.g., first frequency range). As illustrated in FIG. 5, the frequency range 522 is FR2 and has a sub carrier spacing (SCS) of 120 and a duration of the cycles is 0.5 milliseconds (ms). Also, two component carriers (CCs) are of a plurality of CCs are illustrated for the frequency range 522. Specifically, the frequency range 522 includes multiple (e.g., 8) CCs and a first CC 532 (e.g., CC 7) and a second CC 534 (e.g., CC 0) are illustrated in FIG. 5.

In the example of FIG. 5, the base station 502 transmits a periodic grant activation message 542 (e.g., first CG activation message or PDCCH) via the first CC 532 (e.g., a first carrier) and transmits a periodic grant activation message 544 (e.g., second CG activation message or PDCCH) via the second CC 534. The periodic grant activation messages 542, 544 may be acknowledged by corresponding acknowledgment messages, such as by positive ACKs in PDCCHs (not shown but similar to PDCCH 556 or 566). Based on the receipt and transmission of periodic grant activation messages 542, 544 (and optionally corresponding acknowledgment messages) the UE 504 and base station 502 may schedule CGs for future cycles, such as cycles 514, 516 (e.g., first and second cycles after the scheduling or grant cycle 512).

In the example of FIG. 5, the UE 504 and the base station 502 schedule CGs for PUSCHs in cycles 514 and 516. Specifically, the UE 504 schedules first CGs of PUSCH 552 (e.g., first PUSCH) and PUSCH 562 (e.g., third PUSCH) based on periodic grant activation message 542 (e.g., first CG activation message), and the UE 504 schedules second CGs of PUSCH 554 (e.g., second PUSCH) and PUSCH 564 (e.g., fourth PUSCH) based on periodic grant activation message 544 (e.g., second CG activation message).

As illustrated in FIG. 5, first CGs (e.g., PUSCHs 552 and 562) have a first CG configuration 572 (config X), and second CGs (e.g., PUSCHs 554 and 564) have a second configuration 574 (config Y). The configurations may include scheduling parameters, data expiration parameters, transmission parameters, etc. Additionally, each of 552 and 554 correspond to the same TB (first TB) or same packet, and each of 562 and 564 correspond to the same TB (second TB) or same packet. Because each of pair of transmissions, such as shared channel transmissions, and in FIG. 5 specifically CGs, include or correspond to the same TB or same packet, the transmissions may be combined (e.g., a portion of each transmission may be combined). To illustrate, the UE 504 generates the PUSCHs 552 and 554, such as by joint encoding. The UE 504 generates a first MAC-CE for the first PUSCH 552; the first MAC-CE may not include a CC ID. The UE 504 may duplicate the first MAC-CE to generate a second MAC-CE. The UE 504 transmits the PUSCHs 552 and 554 along with their respective MAC-CEs.

The second MAC-CE has an intended CC ID indicated by the UE 504 or the base station 502. To illustrate, in mode 592, the intended CC ID for all duplicated MAC-CEs is indicated by the CC ID 506 in configuration message 540. In mode 594a, the intended CC ID for a duplicated MAC-CE (i.e., second MAC-CE) is indicated by the CC ID 506 included in a message that schedules the duplicated MAC-CE (i.e., PUSCH 554). In mode 594b, the intended CC ID for a duplicated MAC-CE (i.e., second MAC-CE) is indicated by the CC ID 506 included in the duplicated MAC-CE (i.e., second MAC-CE of second PUSCH 554). In such implementations, when generating the duplicated MAC-CE, the intended CC ID 506 in included or injected into the duplicated MAC-CE. In other modes, such as mode 596, the MAC-CEs are unique. To illustrate, first MAC-CE 508 of first PUSCH 552 is different from second MAC-CE 510 of second PUSCH 554.

The base station 502 receives the PUSCHs 552 and 554 along with their respective MAC-CEs. The base station 502 generates a combined PUSCH based on PUSCHs 552 and 554 and using at least the second MAC-CE (e.g., the identified CC ID for the second MAC-CE identifies the CC ID of the CC, here CC7, on which the first MAC-CE and PUSCH 552 were transmitted). The base station 502 may decode the combined PUSCH.

The base station 502 may transmit acknowledgment messages for one or more of the PUSCHs 552, 554, 562, 564 or for the combined PUSCHs. As illustrated in FIG. 5, the base station transmits acknowledgment messages for PUSCHs 552, 562 in corresponding PDCCHs 556, 566.

Referring to FIG. 6, FIG. 6 illustrates a timing diagram 600 illustrating communications between a base station 602 and a UE 604. As illustrated in timing diagram 600, downlink configured grants are illustrated. Base station 602 may direct the UE 604 to use an intended CC ID 606 for downlink configured grants. In some implementations, implementations in mode 692, base station 602 may signal the intended CC ID 606 for one or more CCs by message 640 (e.g., a configuration message, such as first message 448). The message 640 may indicate a fixed or static intended CC ID for multiple duplicated MAC-CEs. In other implementations, implementations in modes 694a and 694b, the base station 602 may signal the intended CC ID 606 by using another message or messages, such as non-configuration messages. Such other messages may indicate a dynamic CC ID 606 for one duplicated MAC-CE.

Referring to timing diagram 600, multiple cycles (first cycle 612, second cycle 614, and third cycle 616) are illustrated for a multiple frequency ranges (e.g., FR1 and FR2), a first frequency range 622 and a second frequency range 624. As illustrated in FIG. 6, the first frequency range 622 is FR2 and has a sub carrier spacing (SCS) of 120, and the second frequency range 624 is FR1 and has a SCS of 60. Also, two component carriers (CCs) are illustrated for the frequency ranges 622 and 624. Specifically, the first frequency range 622 has a first CC 632 (e.g., CC 15) and a second CC 634 (e.g., CC 8), and the second frequency range 624 has a first CC 636 (e.g., CC 7) and a second CC 638 (e.g., CC 0).

In the example of FIG. 6, during operation, the base station 602 transmits a SPS message 642 (e.g., first SPS activation message) via the first CC 632 of the first frequency range 622 and transmits a SPS message 644 (e.g., second SPS activation message) via the first CC 636 of the second frequency range 624. The SPS messages 642, 644 may be acknowledged by corresponding acknowledgment messages, such as by positive ACKs in PUCCHs (not shown but similar to PUCCH 660). Based on the receipt and transmission of the SPS messages 642, 644 (and optionally corresponding acknowledgment messages) the UE 604 and base station 602 may schedule SPS grants for future cycles, such as cycles 614, 616 (e.g., first and second cycles after the scheduling or grant cycle 612).

In the example of FIG. 6, the UE 604 and the base station 602 schedule SPS grants for PDSCHs in cycles 614 and 616. Specifically, the UE 604 schedules first SPSs of PDSCH 652 (e.g., first PDSCH) and PDSCH 662 (e.g., third PDSCH) based on periodic grant activation message 642 (e.g., first SPS activation message), and the UE 604 schedules second SPSs of PDSCH 654 (e.g., second PDSCH) and PDSCH 664 (e.g., fourth PDSCH) based on periodic grant activation message 644 (e.g., second SPS activation message).

As illustrated in FIG. 6, first SPSs (e.g., PDSCHs 652 and 662) have a first SPS configuration 672 (config X), and second SPSs (e.g., PDSCHs 654 and 664) have a second configuration 674 (config Y). The configurations may include scheduling parameters, data expiration parameters, transmission parameters, etc. Additionally, each of 652 and 654 correspond to the same TB (first TB) or same packet, and each of 662 and 664 correspond to the same TB (second TB) or same packet. Because each of pair of transmissions, such as shared channel transmissions, and in FIG. 6 specifically SPSs, include or correspond to the same TB or same packet, the transmissions may be combined (e.g., a portion of each transmission may be combined). To illustrate, the base station 602 generates the PDSCHs 652 and 654, such as by joint encoding. The base station 602 generates a first MAC-CE for the first PDSCH 652; the first MAC-CE may not include a CC ID. The base station 602 may duplicate the first MAC-CE to generate a second MAC-CE. The base station 602 transmits the PDSCHs 652 and 654 along with their respective MAC-CEs.

The second MAC-CE has an intended CC ID indicated by the base station 602. To illustrate, in mode 692, the intended CC ID for all duplicated MAC-CEs is indicated by the CC ID 606 in configuration message. In mode 694*a*, the intended CC ID for a duplicated MAC-CE (i.e., second MAC-CE) is indicated by the CC ID 606 included in a message that schedules the duplicated MAC-CE (i.e., PDSCH 654). In mode 694*b*, the intended CC ID for a duplicated MAC-CE (i.e., second MAC-CE) is indicated by the CC ID 606 included in the duplicated MAC-CE (i.e., second MAC-CE of second PDSCH 654). In such implementations, when generating the duplicated MAC-CE, the intended CC ID 606 in included or injected into the duplicated MAC-CE. In other modes, such as mode 696, the MAC-CEs are unique. To illustrate, first MAC-CE 608 of first PDSCH 652 is different from second MAC-CE 610 of second PDSCH 654.

The UE 604 receives the PDSCHs 652 and 654 along with their respective MAC-CEs. The UE 604 generates a combined PDSCH based on PDSCHs 652 and 654 and using at least the second MAC-CE (e.g., the identified CC ID for the second MAC-CE identifies the CC ID of the CC on which the first MAC-CE and PDSCH 652 were transmitted). The UE 604 may decode the combined PDSCH.

The UE 604 may transmit acknowledgment messages for one or more of the PDSCHs 652, 654, 662, 664. As illustrated in FIG. 6, the UE 604 transmits acknowledgment messages for PDSCHs 652, 654, 662, 664 in corresponding PUCCHs 656, 658, 666, 668.

Although two cycles of uplink CGs and downlink SPS grants are illustrated in FIGS. 5 and 6 respectively, in other implementations, the UE and base station may continue to schedule uplink CGs and/or downlink SPS grants for additional cycles, such as X number of cycles. The amount of cycles may be preprogramed or reconfigurable. As illustrative, non-limiting examples, 2, 3, 4, 5, 6, 7, 10, etc., cycles may be used for X.

Although the CCs are included in a single frequency range in FIG. 5, in other implementations the CCs may be included in multiple frequency ranges, such as FR1 and FR2, as illustrated in FIG. 6. Additionally, or alternatively, the CCs may be split into groups (e.g., QCL groups or groups having same QCL) in one or more frequency ranges. Accordingly, the MAC-CE duplication operations described herein offer improved performance for packet duplication (e.g., cross carrier repetition). The improved performance may include reduced overhead and latency and may enable cross carrier repetition to be performed more quickly, such as for short cycle durations and/or periodic grants, which may be present in 5G and/or URLLC modes.

Figures 7, 8:
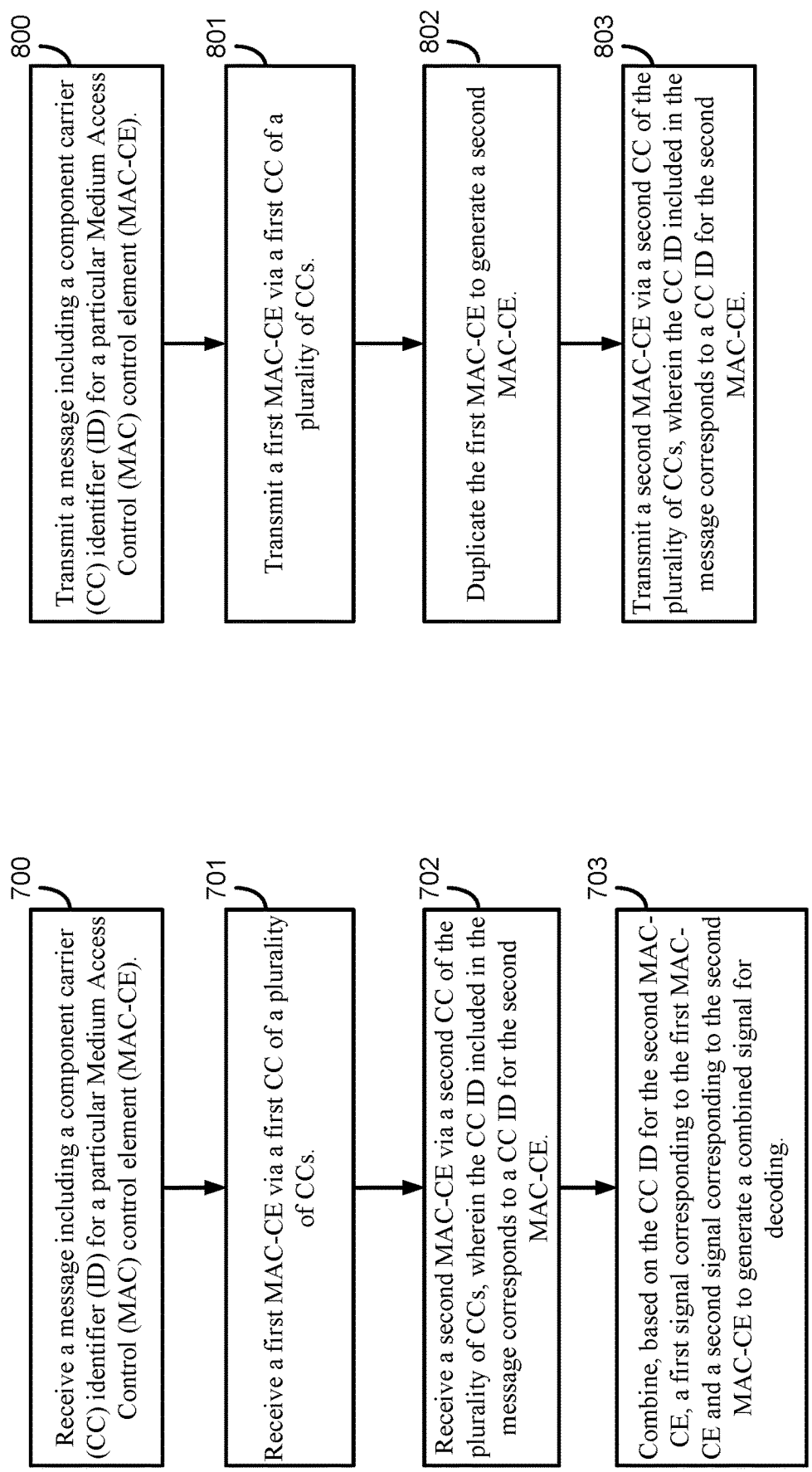
FIG. 7 is a block diagram illustrating example blocks executed by a UE configured according to an aspect of the present disclosure.
FIG. 8 is a block diagram illustrating example blocks executed by a UE configured according to an aspect of the present disclosure.
Figure 9:
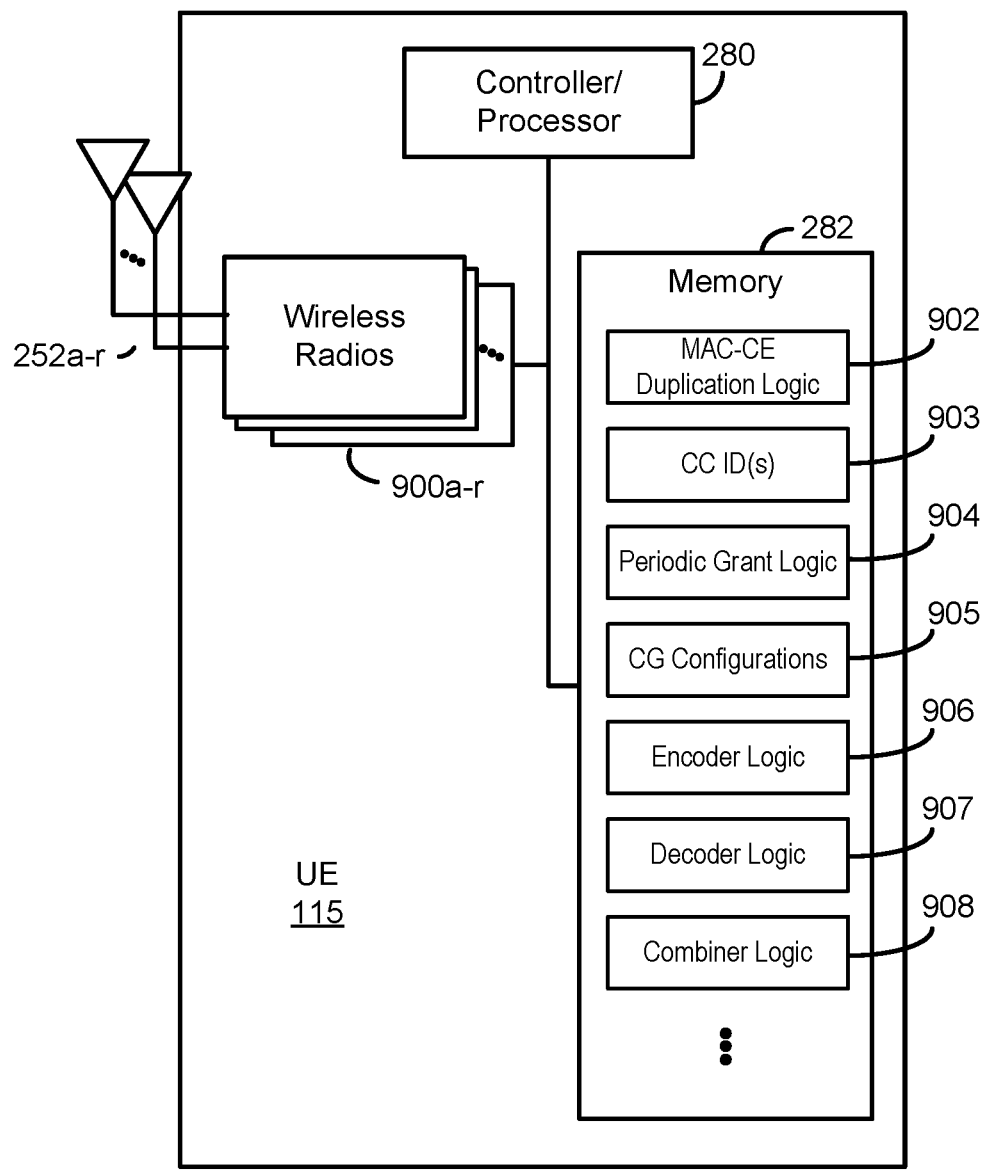
FIG. 9 is a block diagram conceptually illustrating a design of a UE according to some embodiments of the present disclosure.

FIG. 7 is a block diagram illustrating example blocks executed by a UE configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900*a*-*r* and antennas 252*a*-*r*. Wireless radios 900*a*-*r* includes various components and hardware, as illustrated in FIG. 2 for UE 115, including modulator/demodulators 254*a*-*r*, MIMO detector 256, receive processor 258, transmit processor 264, and TX MIMO processor 266. As illustrated in the example of FIG. 9, memory 282 stores MAC-CE duplication logic 902, CC ID data 903, periodic grant logic 904, configured grant configurations data 905, encoder logic 906, decoder logic 907, and combiner logic 908.

At block 700, a mobile communication device, such as a UE, receives a message including a component carrier (CC) identifier (ID) for a particular Medium Access Control (MAC) control element (MAC-CE). A UE, such as UE 115, may execute, under control of controller/processor 280, MAC-CE duplication logic 902, stored in memory 282. The execution environment of MAC-CE duplication logic 902 provides the functionality for UE 115 to define and perform the MAC-CE duplication procedures. The execution environment of MAC-CE duplication logic 902 defines the different MAC-CE duplication processes, such as determining a MAC-CE duplication mode, determining an intended CC ID for a duplicated MAC-CE, signaling an intended CC ID for duplicated MAC-CE, etc. UE 115 receives a downlink message (e.g., a DCI or PDCCH) which includes a CC ID via antennas 252*a*-*r* and wireless radios 900*a*-*r*. UE 115 may send an acknowledgement message responsive to the downlink message to indicate successful reception and decoding of the downlink message.

In some implementations, the downlink message is a periodic grant. In other implementations, another downlink message is received that includes or is a periodic grant. In such periodic grant implementations, the UE 115, may execute, under control of controller/processor 280, periodic grant logic 904, stored in memory 282. The execution environment of the periodic grant logic 904 defines the different periodic grant processes, such as determining a periodic grant configuration (e.g., 408, such as an SPS configuration), configured grant configurations 1005 and/or scheduling (e.g., 442, 444) based on a periodic grant activation or reactivation message (e.g., 542). The UE 115 may schedule or determine a schedule for upcoming downlink transmission based on the periodic grant, and may monitor for and receive such downlink transmissions using antennas 252*a-r* and wireless radios 900*a-r*.

At block 701, the UE 115 receives a first MAC-CE via a first CC of a plurality of CCs. The UE 115 receives a downlink transmission (e.g., first downlink transmission) via wireless radios 900*a-r* and antennas 252*a-r*. The downlink transmission may include the first MAC-CE as a header (e.g., MAC header) or preamble for an accompanying physical layer signal (e.g., symbol or waveform) indicating downlink data.

The execution environment of MAC-CE duplication logic 902 provides UE 115 the functionalities described with respect to the various aspects of the present disclosure, such as determining an intended CC ID. To illustrate, within the execution environment of MAC-CE duplication logic 902, UE 115, under control of controller/processor 280, may determine the intended CC ID for the first MAC-CE is the first CC based on being sent on the first CC, based on a lack of CC ID in the first MAC-CE, based on a lack of signaling for the CC ID for the first MAC-CE, based on the message (e.g., configuration message) received at block 800, or a combination thereof. As an illustrative example, UE 115 determines the intended CC ID for the first MAC-CE is the first CC based on the first MAC-CE being sent on the first CC and based on the first MAC-CE not including a CC ID.

At block 702, the UE 115 receives a second MAC-CE via a second CC of the plurality of CCs, the CC ID included in the message corresponds to a CC ID for the second MAC-CE. The UE 115 receives a second downlink transmission via wireless radios 900*a-r* and antennas 252*a-r*. The second downlink transmission may include the second MAC-CE as a header (e.g., MAC header) or preamble for an accompanying second physical layer signal (e.g., symbol or waveform) indicating downlink data. The second physical layer signal may be a repetition of the (first) physical layer signal received at 701, such as have or correspond to the same TB and/or packet.

The execution environment of MAC-CE duplication logic 902 provides UE 115 the functionalities described with respect to the various aspects of the present disclosure, such as determining an intended CC ID. To illustrate, within the execution environment of MAC-CE duplication logic 902, UE 115, under control of controller/processor 280, may determine the intended CC ID for the second MAC-CE is the first CC based on a lack of CC ID in the second MAC-CE, based on a CC ID included in the second MAC-CE, based on signaling for the CC ID for the second MAC-CE in another message, based on the message (e.g., configuration message) received at block 700, or a combination thereof. As an illustrative example, UE 115 determines the intended CC ID for the second MAC-CE is the first CC based on the message (e.g., configuration message) received at block 700. As another illustrative example, UE 115 determines the intended CC ID for the second MAC-CE is the first CC based on the second MAC-CE including a CC ID (e.g., CC ID field, bit, indicator, flag, etc.), that is the message received at block 700 includes the second MAC-CE of block 702.

At block 703, the UE 115 combines, based on the CC ID for the second MAC-CE, a first signal corresponding to the first MAC-CE and a second signal corresponding to the second MAC-CE to generate a combined signal for decoding. The execution environment of decoder logic 907 and/or combiner logic 908 provides UE 115 the functionalities described with respect to the various aspects of the present disclosure, such as determining an intended CC ID. To illustrate, within the execution environment of the decoder logic 907 and/or the combiner logic 908, UE 115, under control of controller/processor 280, may combine repetitions of physical layer signals (e.g., layer 1 signals) identified at by the UE 115, such as identified using MAC-CE duplication logic 902 based on intended CC ID of duplicated MAC-CE. The combiner logic 908 combines the signals to increase a gain thereof (e.g., combining gain), which enables more reliable and faster decoding. The combiner logic 908 may modify one or more of the signals before combining the signals. Additionally or alternatively, the combiner logic 908 may perform diversity combining on the signals. The combined signal may be decoded using decoder logic 907.

The UE 115 may execute additional blocks (or the UE 115 may be configured further perform additional operations) in other implementations. For example, the UE 115 may decode the combined signal, send an acknowledgment for the combined signal, switch MAC-CE duplications modes, or a combination thereof, after block 703. As another example, the base station 105 may perform one or more operations described above. As yet another example, the base station 105 may perform one or more aspects as described below.

In a first aspect, the message is a MAC-CE duplication configuration message indicating a CC ID for duplicated MAC-CEs, and the MAC-CE duplication configuration message comprises a radio resource control (RRC) message.

In a second aspect, alone or in combination with one or more of the above aspects, the message is a MAC-CE duplication configuration message indicating a CC ID for duplicated MAC-CEs, the MAC-CE duplication configuration message comprises a MAC-CE transmission.

In a third aspect, alone or in combination with one or more of the above aspects, the MAC-CE duplication configuration message indicates a fixed intended CC ID for all MAC-CE duplicates, for all MAC-CE duplicates of a particular type, or for all MAC-CE duplicates for periodic grants.

In a fourth aspect, alone or in combination with one or more of the above aspects, the MAC-CE duplication configuration message indicates a fixed intended CC ID for all MAC-CE duplicates of a particular type.

In a fifth aspect, alone or in combination with one or more of the above aspects, the MAC-CE duplication configuration message indicates a fixed intended CC ID for all MAC-CE duplicates for periodic grants.

In a sixth aspect, alone or in combination with one or more of the above aspects, the UE 115 receives a second MAC-CE duplication configuration message, the second MAC-CE duplication configuration message indicating to switch to a non MAC-CE duplication mode.

In a seventh aspect, alone or in combination with one or more of the above aspects, the UE 115 receives a third MAC-ID; receives a fourth MAC-ID, the fourth MAC-ID different from the third MAC-ID; and combines signals corresponding to the third and fourth MAC-IDs.

In an eighth aspect, alone or in combination with one or more of the above aspects, the message comprises the second MAC-CE, and where the second MAC-CE includes the CC ID.

In a ninth aspect, alone or in combination with one or more of the above aspects, the message comprises a downlink control information (DCI) message, and the DCI message includes the CC ID.

In a tenth aspect, alone or in combination with one or more of the above aspects, the message comprises a third MAC-CE, where the third MAC-CE is received in the same transport block (TB) as the second MAC-CE, and where the third MAC-CE includes the CC ID.

In an eleventh aspect, alone or in combination with one or more of the above aspects, the CC ID of the message is configured to indicate an intended CC ID for a single MAC-CE, where the single MAC-CE corresponds to the second MAC-CE.

In a twelfth aspect, alone or in combination with one or more of the above aspects, combining includes the UE 115 modifying the first signal or the second signal and combining the modified signal with the other of the first signal or the second signal.

In a thirteenth aspect, alone or in combination with one or more of the above aspects, after decoding, the UE 115 transmits an acknowledgment message on at least one CC of the plurality of CCs, the acknowledgment message indicating successful decode of the combined signal.

In a fourteenth aspect, alone or in combination with one or more of the above aspects, prior to receiving the first MAC-CE, the UE 115 receives a downlink control information (DCI) message, where the DCI message comprises an activation for a periodic grant, and where the first MAC-CE and the second MAC-CE correspond to grants of the periodic grant.

In a fifteenth aspect, alone or in combination with one or more of the above aspects, the periodic grant is a semi-persistent scheduling (SPS) type periodic grant.

In a sixteenth aspect, alone or in combination with one or more of the above aspects, duplicating the first MAC-CE includes copying MAC-CE data or generating the same MAC-CE data for another message.

In an eighteenth aspect, alone or in combination with one or more of the above aspects, the first MAC-CE does not include a CC ID, and the first MAC-CE and the second MAC-CE have the same transport block (TB).

In a nineteenth aspect, alone or in combination with one or more of the above aspects, the first MAC-CE comprises a Buffer Status Report type MAC-CE, a C-RNTI type MAC-CE, a UE Contention Resolution Identity type MAC-CE, a Timing Advance Command type MAC-CE, a DRX Command type MAC-CE, a Long DRX Command type MAC-CE, a Configured Grant Confirmation type MAC-CE, a Single Entry PHR type MAC-CE, a Multiple Entry PHR type MAC-CE, a SCell Activation/Deactivation type MAC-CE, a Duplication Activation/Deactivation type MAC-CE, a SP CSI-RS/CSI-IM Resource Set Activation/Deactivation type MAC-CE, a Aperiodic CSI Trigger State Subselection type MAC-CE, a TCI States Activation/Deactivation for UE-specific PDSCH type MAC-CE, a TCI State Indication for UE-specific PDCCH type MAC-CE, a SP CSI reporting on PUCCH Activation/Deactivation type MAC-CE, a SP SRS Activation/Deactivation type MAC-CE, a PUCCH spatial relation Activation/Deactivation type MAC-CE, a SP ZP CSI-RS Resource Set Activation/Deactivation type MAC-CE, or a Recommended bit rate type MAC-CE.

Accordingly, a UE and a base station may indicate an intended CC ID for MAC-CE duplication when a base or original MAC-CE does not indicate an intended CC ID. By indicating an intended CC ID for MAC-CE duplications, TB/packet repetitions may be identified more quickly for combining and processing by UE based on the signaled intended CC ID for the MAC-CE duplications. Thus, latency and overhead are reduced and throughput and reliability are increased.

Figure 10:
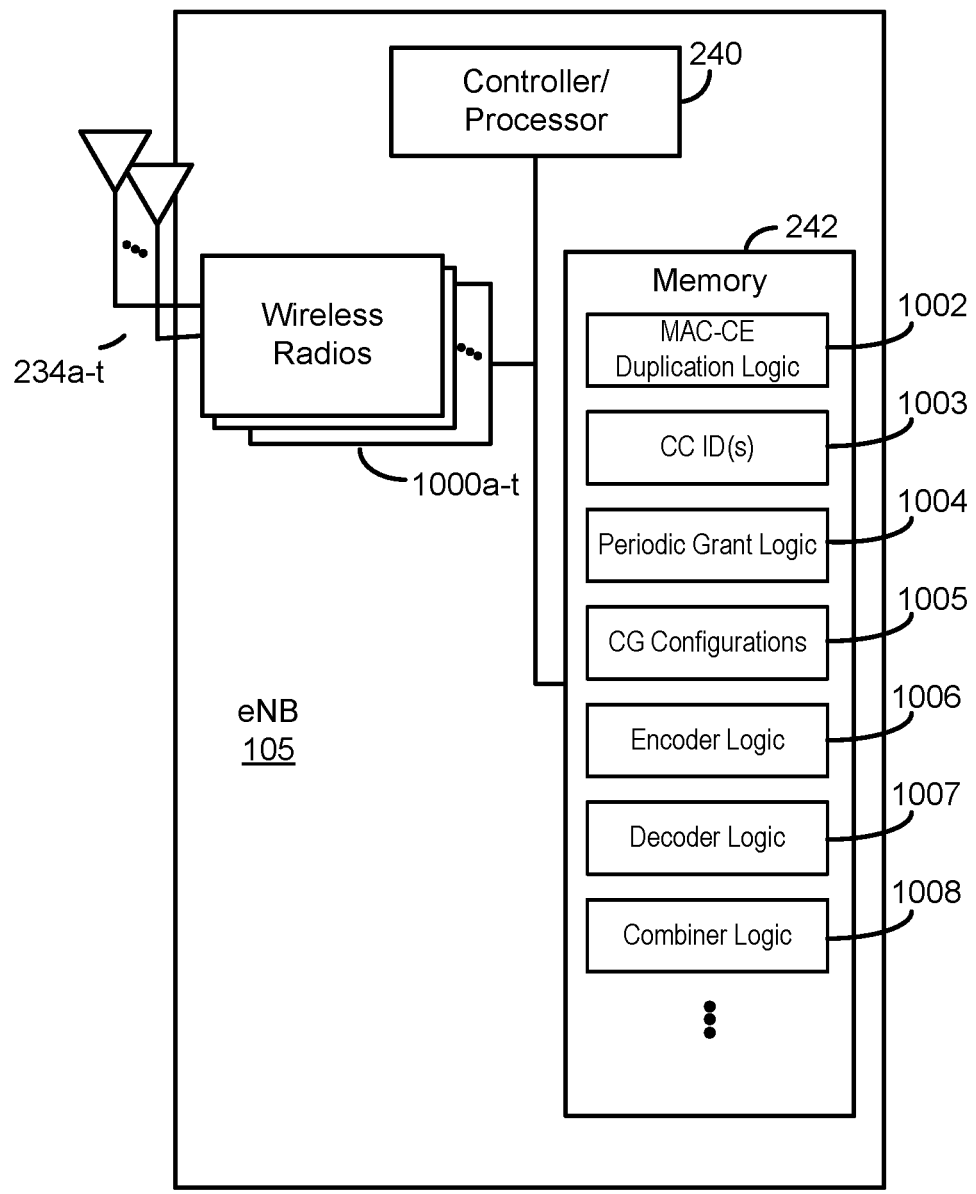
FIG. 10 is a block diagram conceptually illustrating a design of a base station configured according to some embodiments of the present disclosure.

FIG. 8 is a block diagram illustrating example blocks executed by a base station configured according to an aspect of the present disclosure. The example blocks will also be described with respect to gNB 105 (or eNB) as illustrated in FIG. 10. FIG. 10 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1000a-t and antennas 234a-r. Wireless radios 1000a-t includes various components and hardware, as illustrated in FIG. 2 for gNB 105, including modulator/demodulators 232a-t, MIMO detector 236, receive processor 238, transmit processor 220, and TX MIMO processor 230. The data 1002-1008 in memory 242 may include or correspond to the data 902-908 in memory 282, respectively.

At block 800, a mobile communication device, such as a gNB, transmits a message including a component carrier (CC) identifier (ID) for a particular Medium Access Control (MAC) control element (MAC-CE). A gNB, such as gNB 105, may execute, under control of controller/processor 240, MAC-CE duplication logic 1002, stored in memory 242. The execution environment of MAC-CE duplication logic 1002 provides the functionality for gNB 105 to define and perform the MAC-CE duplication procedures.

The execution environment of MAC-CE duplication logic 1002 defines the different MAC-CE duplication processes, such as signaling CC ID for MAC-CE duplicates. As gNB 105 generates and transmits a downlink message (e.g., DCI or PDCCH) which includes a CC ID via antennas 234a-t and wireless radios 1000a-t. Within the execution environment of the MAC-CE duplication logic 1002 (and optionally encoder logic 1006), gNB 105, under control of controller/processor 240, encodes the CC ID for transmission in the message via a selected physical channel.

At block 801, the gNB 105 transmits a first MAC-CE via a first CC of a plurality of CCs. The execution environment of MAC-CE duplication logic 1002 provides the functionality for gNB 105 to define and perform the MAC-CE duplication procedures. The gNB 105 generates and transmits a downlink transmission via antennas 234a-t and wireless radios 1000a-t. The downlink transmission (e.g., a first downlink transmission) may include the first MAC-CE as a header (e.g., MAC header) or preamble for an accompanying physical layer signal (e.g., symbol or waveform) indicating downlink data. Within the execution environment of the MAC-CE duplication logic 1002 (and optionally encoder logic 1006), gNB 105, under control of controller/processor 240, encodes the downlink transmission to be sent via the first CC.

At block 802, the gNB 105 duplicates the first MAC-CE to generate a second MAC-CE. The gNB 105 may copy the data (at least a portion thereof) of the first MAC-CE to generate the second MAC-CE. Within the execution environment of the MAC-CE duplication logic 1002 (and optionally encoder logic 1006), gNB 105, under control of controller/processor 240, generates the duplicated second MAC-CE based on the first MAC-CE.

At block 803, the gNB 105 transmits a second MAC-CE via a second CC of the plurality of CCs. The CC ID included in the message at block 800 corresponds to a CC ID for the second MAC-CE. The CC ID indicates a CC ID of the first CC for the second MAC-CE, and the CC ID is configured to indicate to combine a first signal corresponding to the first MAC-CE and a second signal corresponding to the second MAC-CE to generate a combined signal for decoding.

The execution environment of the MAC-CE duplication logic 1002 provides gNB 105 the functionalities described with respect to the various aspects of the present disclosure. The gNB generates and transmits a second downlink transmission via antennas 234a-t and wireless radios 1000a-t. The second downlink transmission may include the second MAC-CE as a header (e.g., MAC header) or preamble for an accompanying second physical layer signal (e.g., symbol or waveform) indicating downlink data. The second physical layer signal may be a repetition of the (first) physical layer signal received at 701. Within the execution environment of the MAC-CE duplication logic 1002 (and optionally encoder logic 1006), gNB 105, under control of controller/processor 240, encodes the second downlink transmission to be sent via the second CC and such that at least the physical layer signals of the first and second downlink transmissions may be combined and jointly decoded. In some implementations, the gNB 105, under control of controller/processor 240, encodes the CC ID in the second transmission, such as in the second MAC-CE, i.e., the message of block 800 includes or corresponds to the second downlink transmission. In other implementations, the message of block 800 is a separate from the second downlink transmission of block 803.

The base station 105 may execute additional blocks (or the base station 105 may be configured further perform additional operations) in other implementations. For example, the base station 105 may receive uplink signals and combine them. As another example, the base station 105 may perform one or more operations described above. As yet another example, the base station 105 may perform one or more aspects as described below.

In a first aspect, the message is a MAC-CE duplication configuration message indicating a CC ID for duplicated MAC-CEs, and wherein the MAC-CE duplication configuration message comprises a radio resource control (RRC) message.

In a second aspect, alone or in combination with one or more of the above aspects, the message is a MAC-CE duplication configuration message indicating a CC ID for duplicated MAC-CEs, and wherein the MAC-CE duplication configuration message comprises a MAC-CE transmission.

In a third aspect, alone or in combination with one or more of the above aspects, the MAC-CE duplication configuration message indicates a fixed intended CC ID for all MAC-CE duplicates, for all MAC-CE duplicates of a particular type, or for all MAC-CE duplicates for periodic grants.

In a fourth aspect, alone or in combination with one or more of the above aspects, the base station 105 transmits a second MAC-CE duplication configuration message, the second MAC-CE duplication configuration message indicating to switch to a non MAC-CE duplication mode; transmits a third MAC-ID; and transmits a fourth MAC-ID, the fourth MAC-ID different from the third MAC-ID.

In a fifth aspect, alone or in combination with one or more of the above aspects, prior to transmitting the first MAC-CE, transmitting a downlink control information (DCI) message, wherein the DCI message comprises an activation for a periodic grant, and wherein the first MAC-CE and the second MAC-CE correspond to grants of the periodic grant.

In a sixth aspect, alone or in combination with one or more of the above aspects, the periodic grant is a configured grant type periodic grant.

In a seventh aspect, alone or in combination with one or more of the above aspects, the first MAC-CE does not include a CC ID, and wherein the first MAC-CE and the second MAC-CE have the same transport block (TB).

In an eighth aspect, alone or in combination with one or more of the above aspects, further comprising, receiving an acknowledgment message on at least one CC of the plurality of CCs, the acknowledgment message indicating a successful decode of the combined signal.

In a second aspect, alone or in combination with one or more of the above aspects, duplicating the first MAC-CE includes copying MAC-CE data or generating the same MAC-CE data for another message.

In a ninth aspect, alone or in combination with one or more of the above aspects, the message comprises the second MAC-CE, and wherein the second MAC-CE includes the CC ID.

In a tenth aspect, alone or in combination with one or more of the above aspects, the message comprises a downlink control information (DCI) message, and wherein the DCI message includes the CC ID.

In a eleventh aspect, alone or in combination with one or more of the above aspects, the message comprises a third MAC-CE, wherein the third MAC-CE is received in the same transport block (TB) as the second MAC-CE, and wherein the third MAC-CE includes the CC ID.

In a twelfth aspect, alone or in combination with one or more of the above aspects, the first MAC-CE comprises a Buffer Status Report type MAC-CE, a C-RNTI type MAC-CE, a UE Contention Resolution Identity type MAC-CE, a Timing Advance Command type MAC-CE, a DRX Command type MAC-CE, a Long DRX Command type MAC-CE, a Configured Grant Confirmation type MAC-CE, a Single Entry PHR type MAC-CE, a Multiple Entry PHR type MAC-CE, a SCell Activation/Deactivation type MAC-CE, a Duplication Activation/Deactivation type MAC-CE, a SP CSI-RS/CSI-IM Resource Set Activation/Deactivation type MAC-CE, a Aperiodic CSI Trigger State Subselection type MAC-CE, a TCI States Activation/Deactivation for UE-specific PDSCH type MAC-CE, a TCI State Indication for UE-specific PDCCH type MAC-CE, a SP CSI reporting on PUCCH Activation/Deactivation type MAC-CE, a SP SRS Activation/Deactivation type MAC-CE, a PUCCH spatial relation Activation/Deactivation type MAC-CE, a SP ZP CSI-RS Resource Set Activation/Deactivation type MAC-CE, or a Recommended bit rate type MAC-CE.

Accordingly, the UE and gNB may indicate an intended CC ID for MAC-CE duplication when a base or original MAC-CE does not indicate an intended CC ID. By indicating an intended CC ID for MAC-CE duplications, TB/packet repetitions may be identified more quickly for combining and processing by UE based on the signaled intended CC ID for the MAC-CE duplications. Thus, latency and overhead are reduced and throughput and reliability are increased.

Although, FIGS. 7 and 8 are directed to a downlink implementation of MAC-CE duplication. MAC-CE duplication may be performed in uplink, as illustrated and described with reference to FIG. 5. As an illustrative example, the UE may duplicate MAC-CEs and the base station may combine physical layer (layer 1) signals based on signaled intended CC IDs for the duplicated MAC-CEs. The CC IDs may be signaled by the base station, such as by configuration message, or may be signaled by the UE. For example, the UE may signal the CC IDs by a configuration message sent by the UE or based on-demand/dynamic signaling (e.g., one-to-one signaling) by the UE. As illustrative, non-limiting examples of on-demand/dynamic signaling, the duplicated MAC-CE may include the CC ID, another MAC-CE of the TB may include the CC ID, or a scheduling message (e.g., DCI or PDCCH) that schedules the TB may include the CC ID.

For example, a method of wireless communication includes: receiving, by a user equipment (UE), a message including a component carrier (CC) identifier (ID) for a particular Medium Access Control (MAC) control element (MAC-CE); transmitting, by the UE, a first MAC-CE via a first CC of a plurality of CCs; duplicating, by the UE, the first MAC-CE to generate a second MAC-CE; and transmitting, by the UE, a second MAC-CE via a second CC of the plurality of CCs, wherein the CC ID included in the message corresponds to a CC ID for the second MAC-CE, wherein the CC ID indicates a CC ID of the first CC for the second MAC-CE, and wherein the CC ID is configured to indicate to combine a first signal corresponding to the first MAC-CE and a second signal corresponding to the second MAC-CE to generate a combined signal for decoding.

As another example, a method of wireless communication includes: transmitting, by a base station, a message including a component carrier (CC) identifier (ID) for a particular Medium Access Control (MAC) control element (MAC-CE); receiving, by the base station, a first MAC-CE via a first CC of a plurality of CCs; receiving, by the base station, a second MAC-CE via a second CC of the plurality of CCs, wherein the CC ID included in the message corresponds to a CC ID for the second MAC-CE; and combining, by the base station based on the CC ID for the second MAC-CE, a first signal corresponding to the first MAC-CE and a second signal corresponding to the second MAC-CE to generate a combined signal for decoding.

The UE 115 and/or base station 105 may execute additional blocks (or may be configured further perform additional operations) in other implementations. For example, the UE 115 and/or base station 105 each receive multiple/duplicate signals and combine them. As another example, the UE 115 and/or base station 105 may perform one or more operations and/or aspects as described above. To illustrate, the UE 115 may perform similar operations (e.g., duplication operations) and/or aspects to the base station 105 of FIG. 8. As another illustration, the base station may perform similar operations (e.g., combination operations) and/or aspects to the UE 115 of FIG. 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, by a user equipment (UE), a message including a component carrier (CC) identifier (ID) for a particular Medium Access Control (MAC) control element (MAC-CE);
receiving, by the UE, a first MAC-CE via a first CC of a plurality of CCs;
receiving, by the UE, a second MAC-CE via a second CC of the plurality of CCs, wherein the CC ID included in the message corresponds to a CC ID for the second MAC-CE, and wherein the first MAC-CE and the second MAC-CE have a same transport block (TB); and
combining, by the UE based on the CC ID for the second MAC-CE, a first signal corresponding to the first MAC-CE and a second signal corresponding to the second MAC-CE to generate a combined signal for decoding.

2. The method of claim 1, wherein the message is a MAC-CE duplication configuration message indicating a CC ID for duplicated MAC-CEs, and wherein the MAC-CE duplication configuration message comprises a radio resource control (RRC) message.

3. The method of claim 2, wherein the first MAC-CE and the second MAC-CE do not include a CC ID.

4. The method of claim 1, wherein the message is a MAC-CE duplication configuration message indicating a CC ID for duplicated MAC-CEs, and wherein the MAC-CE duplication configuration message comprises a MAC-CE transmission.

5. The method of claim 4, wherein the MAC-CE duplication configuration message indicates a fixed intended CC ID for all MAC-CE duplicates, for all MAC-CE duplicates of a particular type, or for all MAC-CE duplicates for periodic grants.

6. The method of claim 4, wherein the first MAC-CE and the second MAC-CE do not include a CC ID.

7. The method of claim 1, further comprising:
receiving, by the UE, a second MAC-CE duplication configuration message, the second MAC-CE duplication configuration message indicating to switch to a non MAC-CE duplication mode;
receiving, by the UE, a third MAC-ID;
receiving, by the UE, a fourth MAC-ID, the fourth MAC-ID different from the third MAC-ID; and
combining, by the UE, signals corresponding to the third and fourth MAC-IDs.

8. The method of claim 1, wherein combining includes modifying the first signal or the second signal and combining the modified signal with the other of the first signal or the second signal.

9. The method of claim 8, further comprising, after decoding, transmitting an acknowledgment message on at least one CC of the plurality of CCs, the acknowledgment message indicating successful decode of the combined signal.

10. The method of claim 1, further comprising, prior to receiving the first MAC-CE, receiving a downlink control information (DCI) message, wherein the DCI message comprises an activation for a periodic grant, and wherein the first MAC-CE and the second MAC-CE correspond to grants of the periodic grant.

11. The method of claim 1, wherein the first MAC-CE does not include a CC ID.

12. An apparatus configured for wireless communication, the apparatus comprising:
at least one processor; and
a memory coupled to the at least one processor,
wherein the at least one processor is configured:
to receive, by a user equipment (UE), a message including a component carrier (CC) identifier (ID) for a particular Medium Access Control (MAC) control element (MAC-CE);
to receive, by the UE, a first MAC-CE via a first CC of a plurality of CCs;
to receive, by the UE, a second MAC-CE via a second CC of the plurality of CCs, wherein the CC ID included in the message corresponds to a CC ID for the second MAC-CE, and wherein the first MAC-CE and the second MAC-CE have a same transport block (TB); and
to combine, by the UE based on the CC ID for the second MAC-CE, a first signal corresponding to the first MAC-CE and a second signal corresponding to the second MAC-CE to generate a combined signal for decoding.

13. The apparatus of claim 12, wherein the message comprises the second MAC-CE, and wherein the second MAC-CE includes the CC ID.

14. The apparatus of claim 13, wherein the first MAC-CE and the second MAC-CE do not include a CC ID.

15. The apparatus of claim 12, wherein the message comprises a downlink control information (DCI) message, and wherein the DCI message includes the CC ID.

16. The apparatus of claim 15, wherein the first MAC-CE does not include a CC ID.

17. The apparatus of claim 12, wherein the message comprises a third MAC-CE, wherein the third MAC-CE is received in the same transport block (TB) as the second MAC-CE, and wherein the third MAC-CE includes the CC ID.

18. The apparatus of claim 17, wherein the CC ID of the message is configured to indicate an intended CC ID for a single MAC-CE, wherein the single MAC-CE corresponds to the second MAC-CE.

19. A method of wireless communication comprising:
transmitting, by a base station, a message including a component carrier (CC) identifier (ID) for a particular Medium Access Control (MAC) control element (MAC-CE);
transmitting, by the base station, a first MAC-CE via a first CC of a plurality of CCs;
duplicating, by the base station, the first MAC-CE to generate a second MAC-CE, wherein the first MAC-CE and the second MAC-CE have a same transport block (TB); and
transmitting, by the base station, a second MAC-CE via a second CC of the plurality of CCs, wherein the CC ID included in the message corresponds to a CC ID for the second MAC-CE, wherein the CC ID indicates a CC ID of the first CC for the second MAC-CE, and wherein the CC ID is configured to indicate to combine a first signal corresponding to the first MAC-CE and a second signal corresponding to the second MAC-CE to generate a combined signal for decoding.

20. The method of claim 19, wherein the first MAC-CE does not include a CC ID.

21. The method of claim 20, wherein the message is a MAC-CE duplication configuration message indicating a CC ID for duplicated MAC-CEs, and wherein the MAC-CE duplication configuration message comprises a radio resource control (RRC) message.

22. The method of claim 20, wherein the message is a MAC-CE duplication configuration message indicating a CC ID for duplicated MAC-CEs, and wherein the MAC-CE duplication configuration message comprises a MAC-CE transmission.

23. The method of claim 18, wherein the MAC-CE duplication configuration message indicates a fixed intended CC ID for all MAC-CE duplicates, for all MAC-CE duplicates of a particular type, or for all MAC-CE duplicates for periodic grants.

24. The method of claim 20, further comprising, prior to transmitting the first MAC-CE, transmitting a downlink control information (DCI) message, wherein the DCI message comprises an activation for a periodic grant, and wherein the first MAC-CE and the second MAC-CE correspond to grants of the periodic grant.

25. The method of claim 20, wherein duplicating the first MAC-CE includes copying MAC-CE data or generating the same MAC-CE data for another message.

26. An apparatus configured for wireless communication, the apparatus comprising:
at least one processor; and
a memory coupled to the at least one processor,
wherein the at least one processor is configured:
to transmit, by a base station, a message including a component carrier (CC) identifier (ID) for a particular Medium Access Control (MAC) control element (MAC-CE);
to transmit, by the base station, a first MAC-CE via a first CC of a plurality of CCs;
to duplicate, by the base station, the first MAC-CE to generate a second MAC-CE, wherein the first MAC-CE and the second MAC-CE have a same transport block (TB); and
to transmit, by the base station, a second MAC-CE via a second CC of the plurality of CCs, wherein the CC ID included in the message corresponds to a CC ID for the second MAC-CE, wherein the CC ID indicates a CC ID of the first CC for the second MAC-CE, and wherein the CC ID is configured to indicate to combine a first signal corresponding to the first MAC-CE and a second signal corresponding to the second MAC-CE to generate a combined signal for decoding.

27. The apparatus of claim 26, wherein the message comprises the second MAC-CE, and wherein the second MAC-CE includes the CC ID.

28. The apparatus of claim 26, wherein the message comprises a downlink control information (DCI) message, and wherein the DCI message includes the CC ID.

29. The apparatus of claim 26, wherein the message comprises a third MAC-CE, wherein the third MAC-CE is received in the same transport block (TB) as the second MAC-CE, and wherein the third MAC-CE includes the CC ID.

30. The apparatus of claim 26, wherein the first MAC-CE comprises a Buffer Status Report type MAC-CE, a C-RNTI type MAC-CE, a UE Contention Resolution Identity type MAC-CE, a Timing Advance Command type MAC-CE, a DRX Command type MAC-CE, a Long DRX Command type MAC-CE, a Configured Grant Confirmation type MAC-CE, a Single Entry PHR type MAC-CE, a Multiple Entry PHR type MAC-CE, a SCell Activation/Deactivation type MAC-CE, a Duplication Activation/Deactivation type MAC-CE, a SP CSI-RS/CSI-IM Resource Set Activation/Deactivation type MAC-CE, a Aperiodic CSI Trigger State Subselection type MAC-CE, a TCI States Activation/Deactivation for UE-specific PDSCH type MAC-CE, a TCI State Indication for UE-specific PDCCH type MAC-CE, a SP CSI reporting on PUCCH Activation/Deactivation type MAC-CE, a SP SRS Activation/Deactivation type MAC-CE, a PUCCH spatial relation Activation/Deactivation type MAC-CE, a SP ZP CSI-RS Resource Set Activation/Deactivation type MAC-CE, or a Recommended bit rate type MAC-CE.

* * * * *